(12) United States Patent
Magarro

(10) Patent No.: US 7,185,935 B1
(45) Date of Patent: Mar. 6, 2007

(54) TRUCK BED COVER

(76) Inventor: Ed Magarro, 9481 Stone Canyon Rd., Corona, CA (US) 92885

( * ) Notice: Subject to any disclaimer, the term of this patent is extended or adjusted under 35 U.S.C. 154(b) by 0 days.

(21) Appl. No.: 11/214,149

(22) Filed: Aug. 29, 2005

Related U.S. Application Data

(60) Provisional application No. 60/605,125, filed on Aug. 27, 2004.

(51) Int. Cl.
*B60N 3/12* (2006.01)

(52) U.S. Cl. .................... 296/37.6; 296/26.09; 224/404

(58) Field of Classification Search ............... 296/37.6, 296/57.1, 26.09; 224/403, 404, 402
See application file for complete search history.

(56) References Cited

U.S. PATENT DOCUMENTS

| | | | | |
|---|---|---|---|---|
| 2,284,419 A | * | 5/1942 | Greig | 296/26.09 |
| 2,549,018 A | * | 4/1951 | Sarlo | 296/26.09 |
| 4,752,095 A | * | 6/1988 | Brady | 296/37.6 |
| 5,088,636 A | * | 2/1992 | Barajas | 296/37.6 |
| 5,454,684 A | * | 10/1995 | Berens | 296/26.1 |
| 5,964,492 A | * | 10/1999 | Lyon | 296/37.6 |
| 6,354,647 B1 | * | 3/2002 | Voves | 296/37.6 |
| 6,375,054 B1 | * | 4/2002 | Lance et al. | 224/404 |
| 6,460,744 B2 | * | 10/2002 | Lance et al. | 224/404 |
| 6,464,277 B2 | * | 10/2002 | Wilding | 296/37.6 |
| 6,516,983 B2 | * | 2/2003 | Sotiroff et al. | 224/403 |
| 6,726,073 B2 | * | 4/2004 | Sutton | 224/403 |
| 2006/0102669 A1 | * | 5/2006 | Fouts et al. | 224/404 |

* cited by examiner

*Primary Examiner*—Kiran B. Patel
(74) *Attorney, Agent, or Firm*—Kenneth L. Tolar

(57) ABSTRACT

A uniquely designed truck bed cover for securing cargo in a truck bed includes a lower section having a bottom wall with a pair of upstanding sidewalls extending therefrom. Formed on the bottom wall is an elongated groove configured to slidably receive a beam mounted on the bottom surface of the truck bed. On the exterior surface of each sidewall is a ball bearing. The device also includes an upper section having a top wall with a pair of sidewalls depending therefrom. Each sidewall includes an L-shaped channel formed on the interior surface thereof that receives one of the ball bearings on the lower section to cooperatively join the two sections.

3 Claims, 2 Drawing Sheets

US 7,185,935 B1

TRUCK BED COVER

CROSS REFERENCE TO RELATED APPLICATIONS

This application is entitled to the benefit of provisional application No. 60/605,125 filed on Aug. 27, 2004.

BACKGROUND OF THE INVENTION

The present invention relates to a uniquely designed truck bed cover for securing cargo within a pickup truck bed.

DESCRIPTION OF THE PRIOR ART

Pickup truck beds provide a convenient means for transporting heavy or massive cargo. However, because the truck bed is open, the cargo is susceptible to theft or vandalism. The present invention addresses this problem by providing a uniquely designed truck bed cover that secures cargo positioned within a truck bed.

SUMMARY OF THE INVENTION

The present invention relates to a truck bed cover for securing cargo. The device comprises a spring-biased depressible button secured to the bottom surface of a truck bed. The cover further includes a lower section including a bottom wall with a pair of sidewalls upwardly extending therefrom, an open front, an open rear and an open top. The rear end includes a retaining bar extending from one of the sidewalls to the other to retain stored cargo. The bottom wall includes an elongated, centrally disposed groove on its exterior surface that is dimensioned and configured to slidably receive the button mounted within the truck bed. The bottom wall further includes a pair of extension arms that are each slidably received within an elongated slot formed on the bottom wall. The arms include a hinge member at a distal end that is secured to a mating hinge member on the truck tail gate. The arms allow the unit to be slid forward whenever the tail gate is open to facilitate loading and unloading. The device also includes an upper section to including a top wall with a pair of sidewalls depending therefrom. On the interior surface of each sidewall is a roller for inserting into one of the channels on the lower section to removably secure the upper section thereto.

To install the above described cover, a user raises the button and slides the lower section thereon. The upper section is superimposed on the lower section with each roller appropriately positioned within a corresponding channel. When loading cargo into the cover, a user can slide the cover along the button and arms toward the truck tailgate as far as necessary. Once the cargo is completely loaded, the cover is then slid forward towards the front of the truck bed allowing the tailgate to be raised and locked.

It is therefore an object of the present invention to provide a truck bed cover that securely retains cargo within a truck bed.

It is another object of the present invention to provide a truck bed cover that is easily to install and disassemble.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 2:
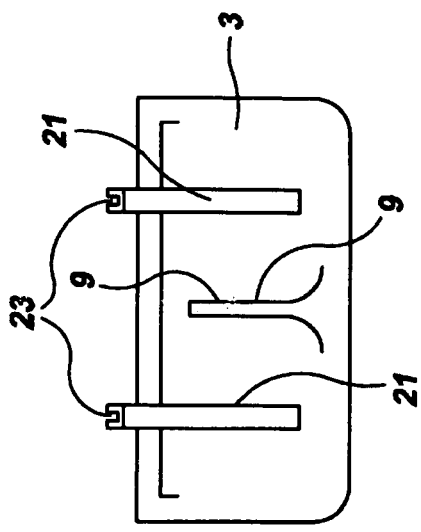
FIG. 2 is a bottom view of the lower section.
Figure 3:
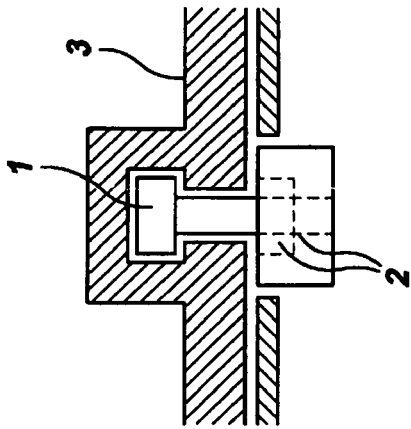
FIG. 3 is a plan, cross-sectional view of the spring-biased button and mating groove for securing the lower section to the truck bed.
Figure 1:
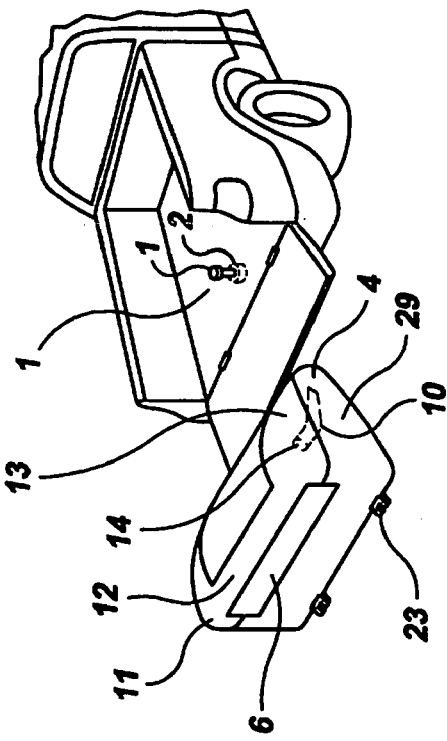
FIG. 1 is a perspective view of a truck bed and the cover according to the present invention.
Figure 4:
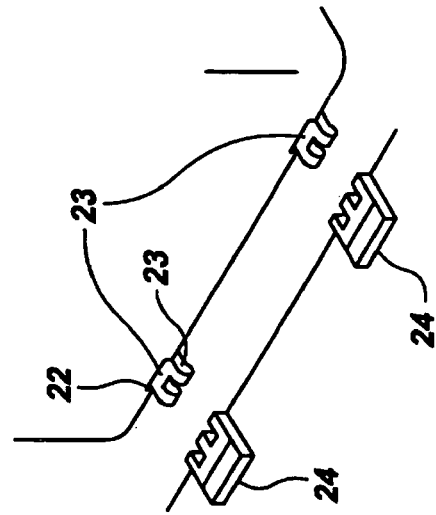
FIG. 4 is a perspective view of the mating hinges that secure the extension arms to the tailgate.
Figure 6:
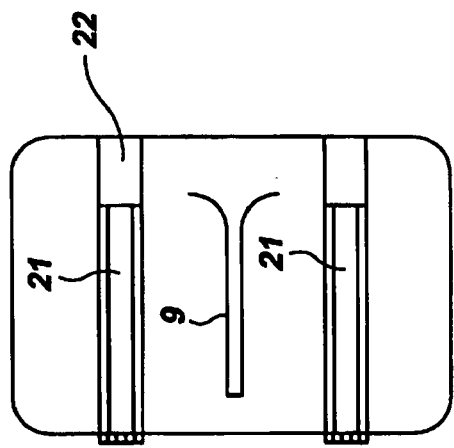
FIG. 6 is a bottom view of the lower section with the extension arms in an extended position.
Figure 7:
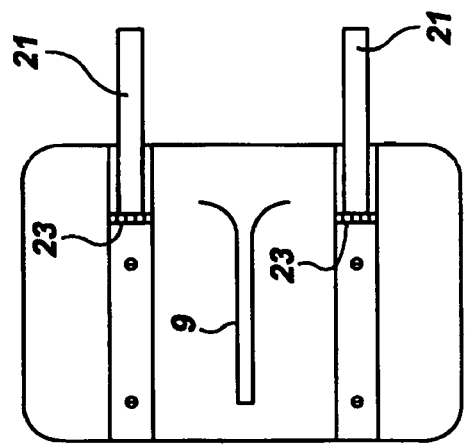
FIG. 7 is a bottom view of the lower section with the extension arms in a retracted position.
Figure 5:
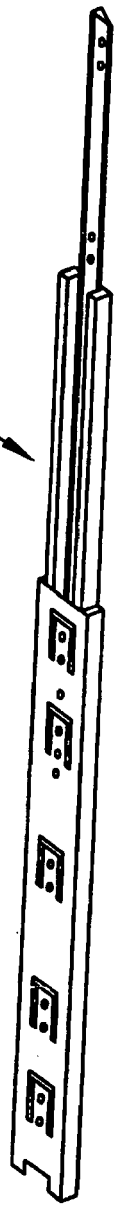
FIG. 5 is a perspective view of the extension arms.

The present invention relates to a truck bed cover for securing cargo. The device comprises a spring-biased, depressible button 1 mounted on the bottom surface of a truck bed. The button may be pressed into a receptacle 2 that retains the button flush with the truck bed surface when the cover is not in use. The button includes a conventional releasable locking mechanism that automatically retains the button in a retracted orientation when the button is depressed. The locking mechanism is automatically released when the button is depressed a second time.

The device further includes a lower section 29 including a bottom wall 3 with a pair of sidewalls 4 upwardly extending therefrom, a front 5, an open rear 6 and an open top 7. The rear end may include a retaining bar extending from one of the sidewalls to the other. The bottom wall includes an elongated, centrally disposed groove 9 on its exterior surface that is dimensioned and configured to slidably receive the button mounted within the truck bed. On the exterior surface of each side wall is a substantially L-shaped channel 10. The bottom wall further includes a pair of extension arms 21 that are each slidably received within an elongated slot 22. The arms include a hinge member 23 at a distal end that is secured to a mating hinge member 24 on the truck tailgate. The arms are formed of multiple, telescoping sections allowing them to extend and retract. The arms guide the unit forward whenever the tailgate is open to facilitate loading and unloading.

The device also includes an upper section 11 including a top wall 12 with a pair of sidewalls 13 depending therefrom. On the interior surface of each sidewall is a roller 14 that is slidably inserted into one of the channels on one of the lower section sidewalls. Preferably, the upper section includes a lock for securing the upper section to the lower section.

To use the above described device, the button is installed within the truck bed bottom surface and the lower section is slidably mounted thereon. The upper section is placed over the lower section with roller positioned within a corresponding channel. When loading or unloading cargo into the cover, a user can slide the cover along the button and extension arms toward the truck tailgate as far as necessary. Once the cargo is completely loaded, the cover is then slid forward towards the front of the truck bed allowing the tailgate to be raised and locked.

The above described device is not limited to the exact details of construction and enumeration of parts provided herein. Furthermore, the size, shape and materials of construction can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The invention claimed is:

1. A truck bed cover for securing cargo comprising:
   a spring-biased, depressible button mounted on a bottom surface of a truck bed;
   a lower section including a bottom wall with a pair of sidewalls upwardly extending therefrom, an open front, an open rear and an open top, said bottom wall having an elongated, centrally disposed groove thereon that is dimensioned and configured to slidably receive the button mounted within the truck bed; each of said sidewalls including channel thereon;
   an upper section including a top wall with a pair of sidewalls depending therefrom and a roller on each sidewall that is slidably inserted into one of the channels on one of the lower section sidewalls.

2. The cover according to claim 1 wherein said button is insertable into a receptacle whereby said button retains flush with the truck bed surface when the cover is not in use.

3. The cover according to claim 1 further including a pair of extension arms each slidably received within an elongated slot on the bottom wall of said lower section, each arm having a hinge member at a distal end that is secured to a mating hinge member on a truck tailgate said arms allowing said cover to slide forward whenever the tailgate is open to facilitate loading and unloading.

* * * * *